Jan. 12, 1943.    H. C. WRIGHT    2,308,223
SHEARING COMB
Filed Feb. 16, 1942
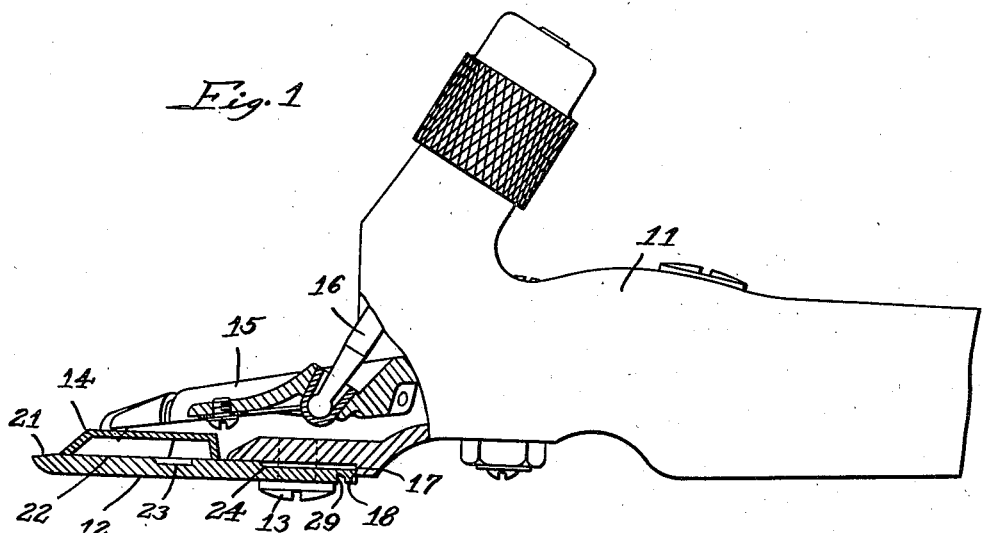
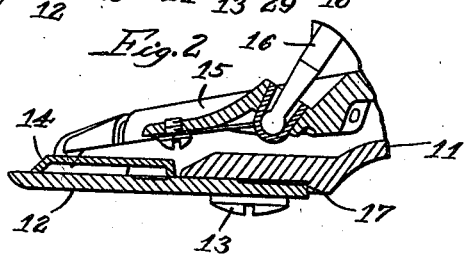
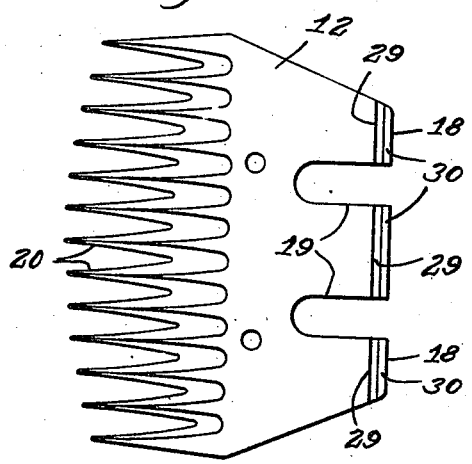
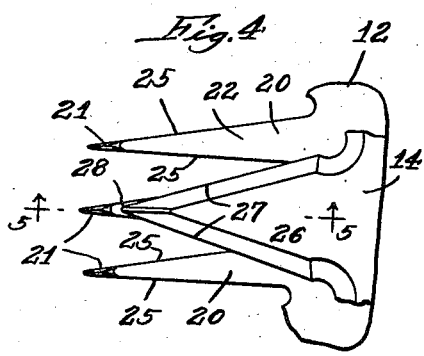
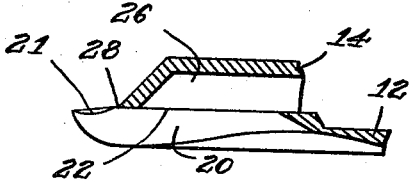
Inventor:
By Horace C. Wright
McCanna, Wintercorn & Morsbach Patented Jan. 12, 1943

2,308,223

UNITED STATES PATENT OFFICE 2,308,223

SHEARING COMB

Horace C. Wright, Chicago, Ill., assignor to Chicago Flexible Shaft Company, Chicago, Ill., a corporation of Illinois Application February 16, 1942, Serial No. 430,998

4 Claims. (Cl. 30—199)

This invention relates to a certain problem in sheep shearing machines, dealing with the positioning of the shearing comb in relation to the cutter with which it coacts. The problem involves the conditions after the comb and cutter have been reduced in thickness by repeated grindings.

It will be observed in this art that the ends of the teeth on a new shearing comb are bevelled and pointed on the top side and that the ground top surface of the comb teeth which provides the cutting edges against which the teeth of the moving cutter coact in cutting the wool does not extend to the extreme end of the comb teeth but rather to the aforesaid bevelled portions. Also, provision is made in the handpiece which carries the comb and cutter, to maintain the comb in such a position in relation to the cutter that the ends of the cutter teeth move back and forth in an arc spaced back from the aforementioned bevelled portions. Thus the narrow bevelled ends of the comb teeth serve to separate the wool fibers into parallel rows and to properly present the wool to the cutting edges as the teeth move forwardly through the wool. Since a shearing comb is ground over the entire top surface to sharpen the cutting edges of the teeth, repeated grinding reduces the thickness of the comb. This reduction in thickness of the comb causes the ground portion of the teeth to approach closer to the leading points of the teeth until the top bevel above mentioned has disappeared. If a new, full thickness cutter was always used on the shearing comb, the moving ahead of the cutting edges on the comb teeth as a consequence of grinding would not be a serious matter; but the cutter is also reground over the entire lower surface and because of this and the pronounced bevel of its teeth, the cutter also is in time materially reduced in thickness. Thus, as the ground surface on the comb teeth moves farther forward and the points of the cutter teeth move back in relation to the points of the comb teeth as a result of repeated grindings, the place on the comb teeth where the wool fibers are cut moves farther and farther back on the comb teeth. This in effect extends the length of the comb teeth in relation to the effective cutting edges and presents an undesirable condition which is spoken of by experienced shearers as "combing too much wool."

To overcome this condition, experienced shearers sometimes break off the fixed stop against which the comb plate abuts on the handpiece, allowing the comb plate to be moved back on the handpiece to compensate for the grinding and thereby maintain the desired relation between the comb and cutter teeth. However, removal of the comb stop is a serious drawback because the stop serves as a gauge for locating the comb plate with relation to the cutter; consequently when attaching the comb plate to the handpiece after the stop has been removed, extreme care must be used in adjusting the comb plate and in maintaining the adjustment when tightening the comb clamping screws. On the other hand, adjustable comb stops have heretofore been provided, but they have not been found practicable, due mainly to the more or less complicated structure, the tendency to collect wool fibers and foreign matter, and the time and the difficulty required for making adjustments.

The object of the present invention is to provide a simple and practical solution of this problem; and to this end I have provided a shearing comb having means whereby it may be quickly and easily shortened in length to compensate for the change in relation of the cutting edges of the comb and cutter resulting from repeated grindings. This is accomplished preferably by the provision of a groove in the comb plate parallel with and adjacent to the rear stop edge thereof, so that after the comb plate has been substantially reduced in thickness by grinding as above described, its rear edge portion may be broken off at a predetermined line of separation defined by the groove, thereby providing a new abutment edge on the comb plate adapted for seating against the comb stop on the handpiece. This permits quick and easy resetting and location of the comb plate closely approximating the relation between a new comb and cutter.

Referring to the drawing:

Figure 1 is a side elevation of a shearing handpiece with the comb and cutter end in vertical section, showing a new comb plate embodying my invention;

Fig. 2 is a similar sectional view but showing the relation of the comb and cutter after repeated grindings and with the comb plate reset according to my invention;

Fig. 3 is a bottom view of the comb plate;

Fig. 4 is an enlarged top view of a cutter tooth and several comb teeth in the relation shown in Fig. 1; and Fig. 5 is a section taken substantially on the line 5—5 of Fig. 4.

The drawing shows a well known type of handpiece designated generally by 11, a comb plate 12 attached to the under side of the handpiece by clamping screws preferably of the oval fillister head type, a cutter 14 coacting with the comb plate, and a fork structure 15 adapted to be rapidly oscillated by a suitable power drive (not shown), the driving fork serving to rapidly move the cutter back and forth over the comb plate to perform the cutting operation in a manner well known in this art. Tension between the cutting edges may be obtained by any suitable means, as by a tension pin 16. In this type of handpiece a comb stop 17, or equivalent means, is provided for the rear edge 18 of the comb plate to seat against. This comb stop extends crosswise of the handpiece and serves to locate the rear edge of the comb plate in a plane at right angles to its longitudinal center line so that when the comb plate is seated against the stop its teeth are properly located with relation to the cutter. The slots 19 in the comb plate are for passage of the clamping screws 13 and to permit a limited amount of adjustment lengthwise. They also serve to locate the comb plate against lateral displacement. Each comb tooth 20 has its leading end portion bevelled downwardly on its top and sides as shown at 21, to aid in entering and separating the wool fibers. The top surface of the comb plate is ground flat at 22 except for suitable relief areas 23 and 24, thus providing ground cutting edges 25 extending the full length of the comb teeth except for the bevelled ends 21. These ends lead into the wool and separate the fibers into parallel swaths which move into the bites between the cutting edges as the handpiece is moved through the wool. Each cutter tooth 26 has cutting edges 27 which coact in a shearing action with the edges 25. When the comb and cutter are new the points 28 of the cutter teeth are located rearwardly from the bevelled portions 21 and coact with the flat ground surface 22, as shown in Figs. 1, 4 and 5. This arrangement gives the most efficient shearing results. However, after repeated grindings of both the comb and the cutter plates the points 28 recede and the bevelled portions 21 are ground off, leaving relatively long leading points on the comb teeth which result in combing too much wool, as above mentioned.

My invention provides for restoring the comb plate to substantially its original relation with the cutter teeth by the provision of novel means for shortening the length of the comb plate. To this end, I have, in the preferred embodiment, grooved the under side of the comb plate as a means of permitting breaking off of the rear end portion of the plate along a predetermined line of separation. One or more grooves may be provided to permit of successive lengthwise separations. In the preferred embodiment I use only a single groove 29 having a V-shaped bottom arranged as shown in Fig. 1, so that the deepest point of the V defines the line of separation, that is, the predetermined line at which the rear end portion of the plate is to be broken off from the comb plate proper, in keeping with my invention. This groove may be milled or otherwise formed in the steel comb plate. Obviously the end portion 30 may be broken off by means of ordinary hand pliers, leaving a finished abutment edge adapted to seat against the stop 17 in the manner shown in Fig. 2. The comb plate is thus reset with relation to the cutter in approximately the same relation thereto as when the comb and cutter were new and, in this resetting, the comb plate is definitely located in the desired alignment with the cutter. In this reset position the leading points of the comb teeth do not comb too much wool and it follows that the general efficiency of the comb and cutter is substantially maintained in proportion with the life of the cutting parts.

Various modifications may be made in the device without departing from the spirit and scope of my invention, and I desire, therefore, that only such limitations shall be placed thereon as are imposed by the prior art and the appended claims, in which—

I claim:

1. A shearing comb for coaction with a cutter on the handpiece of a shearing or clipping machine, the shearing comb having provision for lengthwise adjustment relative to the cutter and having an abutment portion provided with a rear abutment edge adapted to seat against a stop on the handpiece to locate the comb with respect to the cutter, and having means providing a breaking section along a predetermined line at the front of said abutment portion permitting removal of said abutment portion by breaking it from the comb plate along said line, whereby to provide a new abutment portion having a rear abutment edge at said line adapted to seat against said stop.

2. A shearing comb for coaction with a cutter on the handpiece of a shearing or clipping machine, comprising a comb plate having provision for lengthwise adjustment relative to the cutter and having a rear abutment edge adapted to seat against a stop on the handpiece, the comb plate having a narrow groove of substantial depth adjacent to and forwardly of its rear abutment edge and parallel therewith to permit the breaking off of its rear edge portion at the line of the groove to provide a new abutment edge for coaction with said stop.

3. A shearing comb as set forth in claim 2, in which the groove extends from side to side of the comb plate.

4. A shearing comb of the character described having provision for shortening its length comprising a comb plate having a narrow V-shaped groove close to and parallel with its rear edge arranged so that the deepest point of the groove provides a predetermined breaking line for separation of the rear edge portion from the comb plate proper.

HORACE C. WRIGHT.